Patented Dec. 22, 1942

2,305,657

UNITED STATES PATENT OFFICE 2,305,657

DECOLORIZING AND PURIFYING LIQUIDS

Walter Robert Aehnelt, Amsterdam, Netherlands; vested in the Alien Property Custodian No Drawing. Application July 20, 1938, Serial No. 220,394. In Germany March 7, 1938

4 Claims. (Cl. 210—62)

This invention relates to a process for jointly decolorizing and purifying liquids, and more particularly by the employment of adsorbent or filtering agents, such as active carbon, infusorial earth, fuller's earth and the like, or mixtures of adsorbent or filtering agents.

In order to improve the decolorizing and purifying effect, it has already been proposed to carry out the treatment of liquids, such as saccharine juices and solutions of all kinds—including solutions of glucose, lactose and the like—with the aforesaid adsorbent and filtering agents in the presence of a small amount of a gel. In the case of this process, however, it is essential that the gel should always be used in a fresh condition, since it is very liable to become inactive, through ageing, on account of the presence of electrolytes due to the process of its production. Another known proposal relates to mixing the aforesaid adsorbent or filtering agents, prior to the treatment of the liquid to be purified with such chemical compounds as react with the aqueous liquid to be purified and form a gel, or a gelatinous precipitate. In many cases, this method of procedure has the drawback that fresh quantities of electrolytes pass into the liquid under treatment and increase the ash content which constitutes a measure of the purity of the liquids.

It has now been ascertained in accordance with the present invention that the undesirable increase in the ash content of the liquids during their treatment with adsorbent or filtering agents and gel formers can be prevented by replacing chemical compounds by elements, or mixtures of elements, such as metals or alloys in powder form, which are capable of forming a hydroxyl gel. Typical substances, highly suitable for carrying out the process of the invention, comprise aluminium powder, or pulverulent alminium alloys or mixtures of aluminium powder, with other powdered metals. Powdered silicon, or mixtures or alloys of this element with other elements, are also suitable for carrying out the process.

Owing to its reducing action on colouring agents, the nascent hydrogen generated by the action of the elements, or mixtures of same further increases, in most instances, the combined effect of the gel and the decolorizing or filtering agents. The resulting gel is located on the surface of the powder and can therefore be more easily separated together with the adsorbent or filtering agents used, than is the case with gels which are formed, for example, from salts. In some cases, only a portion of the powder is transformed into gel. It may also happen, for example in treating acid, or comparatively alkaline liquids that more or less of the element passes into solution, in which event the dissolved element can be got rid of by precipitation.

In some instances it may also be of advantage to employ the elements, or mixtures of same, in association with substances or chemical compounds, such as phosphates, which are capable of forming gels other than hydroxyl gels.

The combined employment of elements in powder form and decolorizing or filtering agents according to the present invention overcomes the difficulties otherwise encountered in mixing liquids with metallic powders, and due to the low wetting capacity of the latter. Moreover, the fine powders can be more easily removed by filtration when associated with the decolorizing or filtering agents, than would be expected in view of their character.

It has transpired that a very fine state of distribution of the powder increases its efficiency, so that it is advisable to employ the elements in the finest possible state of division. This is the more readily accomplished because, as already mentioned, the decolorizing or filtering agents employed in association with the metallic powder enable clean separation to be obtained.

The incorporation of the adsorbent or filtering agent with the powdered element is preferably effected by mechanical means, such as a mechanical mixer, so that an intimately mixed and homogeneous product is obtained.

In most cases, the amount of powder to be employed may be very small. In some cases, even a few thousandths, to a few hundredths, of 1% are sufficient to produce a considerable decolorizing effect.

I claim:

1. A process for decolorizing and purifying liquids capable of reacting with aluminium to form an hydroxyl gel which comprises simultaneously intimately contacting the liquid to be decolorized and purified with a mixture of finely pulverulent aluminium and a finely divided solid adsorbent capable of adsorbing impurities and coloring matter from the liquid.

2. A process for decolorizing and purifying liquids capable of reacting with aluminium to form an hydroxyl gel which comprises simultaneously intimately contacting the liquid to be decolorized and purified with a finely pulverulent metal mixture comprising aluminium and a finely divided solid adsorbent capable of adsorbing impurities and coloring matter from the liquid.

3. A process of decolorizing and purifying liquids capable of reacting with aluminium to form an hydroxyl gel which comprises simultaneously intimately contacting the liquid to be decolorized and purified with a finely pulverulent metal mixture comprising an aluminium alloy and a finely divided solid adsorbent capable of adsorbing impurities and coloring matter from the liquid.

4. A process for decolorizing and purifying liquids capable of reacting with aluminium to form an hydroxyl gel which comprises simultaneously intimately contacting the liquid to be decolorized and purified with a mixture comprising finely pulverulent aluminium, a finely divided adsorbent capable of adsorbing impurities and coloring matter from the liquid, and a soluble phosphate.

WALTER R. AEHNELT.